United States Patent Office 3,274,108
Patented Sept. 20, 1966

3,274,108
LUBRICANT COMPOSITIONS CONTAINING POLYESTER ADDITIVES
George Wolfram, Des Plaines, and Theodore H. Szawlowski, Wonder Lake, Ill., and Louis A. Joo, Johnson City, Tenn., assignors, by mesne assignments, to Union Oil Company of California, Los Angeles, Calif., a corporation of California
No Drawing. Filed Apr. 15, 1963, Ser. No. 272,863
11 Claims. (Cl. 252—48.6)

This invention relates to novel and improved oleaginous or viscous residual oil compositions or gear lubricants having superior adhesive and cohesive characteristics and to the method of preparation of such compositions. More particularly, this invention relates to oleaginous or viscous residual oil compositions or gear lubricants containing a small amount of unpolymerized fluid resins of the polyester type containing unreacted carboxyl groups prepared by the reaction of (1) complex carboxylic acids derived from sulfur-containing aromatic compounds of petroleum origin as illustrated by solvent extracts, obtained in the solvent extraction of mineral lubricating oils using a solvent selective for aromatic compounds, by metalation, carbonation and acidification of such source materials, (2) unsaturated or saturated dibasic acids or their anhydrides, and (3) glycols or polyols of unsaturated or saturated character or their mixtures.

The oleaginous or gear lubricant compositions of this invention are distinguished from conventional gear lubricants in that the herein-described unpolymerized and un-cross-linked resins of the polyester type are used in place of the commercially used wood rosin or other tackiness agents to impart superior tackiness and cohesiveness to the lubricant.

It is known in the art that one of the most important characteristics of certain lubricants, such as those used on wire rope, open gears, and so forth, is the ability to remain on the exposed members of such assemblies. Such lubricants must possess sufficient tackiness to adhere to the metal and non-metal components and yet be sufficiently fluid to permit unrestricted operation of the moving members. In the case of wire ropes, the lubricant must adhere to the surfaces thereof without making them inflexible or otherwise impeding their use. In addition to being adhesive toward metals, the lubricant must also be cohesive, that is, it must stick to itself as well as to the machine component or rope so that a coating of adequate thickness can be maintained. In the formulation of this type of lubricant, an adequate balance of adhesion and cohesion is essential. Although there are available many materials which attain this result, many are prohibitive costwise. Furthermore, the progress of petroleum technology has resulted in a reduction of the available supply of certain of these addends, particularly the less costly ones and substitutes have had to be provided.

It is accordingly, a primary object of this invention to provide a new and improved adhesive petroleum lubricant which derives its adhesive characteristics from unpolymerized and uncross-linked resins of the polyester type prepared from mixed complex mono-, di-, and polycarboxylic acids derived from sulfur-containing aromatic compounds of petroleum origin, unsaturated or saturated dibasic acids or their anhydrides and glycols or polyols.

Another object of this invention is to provide a new and improved adhesive petroleum lubricant which is more adherent for a given amount of adhesive addend used than in previous compositions.

A feature of this invention is the provision of a new and improved adhesive petroleum lubricant composed of viscous lubricating oil residues containing a small amount of unpolymerized and uncross-linked resins of the polyester type prepared from polycarboxylic acids derived from solvent extracts, unsaturated or saturated dibasic acids or their anhydrides and saturated or unsaturated glycols or polyalcohols or their mixtures.

Other objects and features of this invention will become apparent or be described as the specification proceeds.

In gear lubricants which are intended for use at high loads and elevated temperatures the requirements of adhesiveness, cohesiveness, and high-film strength are even more desirable because the retention of a lubricant on the rubbing surfaces is more difficult. Often agents which impart tackiness, adhesiveness, or cohesiveness to the composition do not possess sufficient film strength under adverse conditions, i.e., high load and elevated temperatures, to be effective. Where the lubricant is to be applied by brushing, spraying, or dipping, particularly if the applications are intermittent, these properties become paramount.

Conventional tackiness agents, though effective, such as wood rosin, are subject to fluctuations in availability and price, and often do not form satisfactory lubricants for such diverse application as wire-rope lubricants, E.P. gear lubricants or for the lubricantion of open gears. Consequently, a number of potential substitutes for conventional tackiness agents, such as wood rosin, have been tested in the past with little success.

The instant invention is based on the discovery that the unsaturated liquid and oil-soluble polyester as produced immediately after esterification (without further copolymerization or cross-linking with unsaturated monomers like styrene) and as described in copending application Serial No. 247,515, filed December 27, 1962, by T. H. Szawlowski and Louis A. Joo, has the unusual property of imparting a high degree of metal adhesiveness and internal cohesiveness to oleaginous vehicles and viscous residual oils, when compounded therewith in amounts ranging from about 0.1 to 1.0% by wt. and preferably within the range of 0.2–0.5% weight based on the total weight of the composition. The invention has particular application to compositions containing the aforesaid proportions of the liquid unpolymerized polyesters of said copending application wherein the oleaginous vehicle is a residual oil, such as asphalt, solvent extracts from the manufacture of mineral lubricating oils, as herein more fully described in relation to the derivation of the polyester resins, and said oleaginous vehicle has some inherent adhesive and cohesive properties which are amplified by the incorporation of relatively small amounts of the polyesters.

Also in accordance with this invention we have found that a petroleum lubricating composition characterized by its adhesiveness, cohesiveness and film strength can be compounded by incorporating between about 0.1 to 1.0% by weight of the polyesterification product prepared from complex mixed polycarboxylic acids derived from solvent extracts and related sources of complex polynuclear compounds by metalation, carbonation and acidification, or fractions thereof, one or more dibasic acids or their anhydrides, and a diol or polyol in which either the dibasic acid or the diol or the polyol or both the dibasic acid and the diol or polyol are unsaturated.

THE COMPLEX POLYCARBOXYLIC ACIDS

The complex carboxylic acids or acid mixtures used in accordance with this invention are prepared in accordance with the processes disclosed in copending application Serial Number 819,932, filed June 12, 1959, and now abandoned, by Thomas W. Martinek, and Serial Number 79,661, filed December 30, 1960, by Messrs. W. E. Kramer, L. A. Joo and R. M. Haines, now Patent No. 3,153,087.

These acids are further described in related copending applications, Serial Number 79,541, filed December 30, 1960, by Messrs. W. E. Kramer and L. A. Joo, now Patent No. 3,154,507, and Serial Number 79,506, filed December 30, 1960, by Thomas W. Martinek.

In accordance with said copending applications the complex, polynuclear, aromatic, and alkaromatic carboxylic acids used to prepare the novel compositions of this invention are derived by metalation, carbonation, and acidification of a source of complex, polynuclear, aromatic nuclei.

The resulting complex acids, hereinafter referred to as extract acids, or EPA, are mixtures of mono-, di-, and polycarboxylic acids. Through chemical analysis, characterization and study of the physical and chemical properties, by way of illustration only, the extract acids can be represented by the following formulae:

Monobasic acids

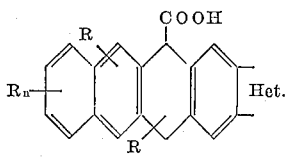

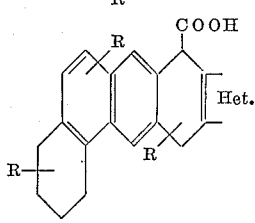

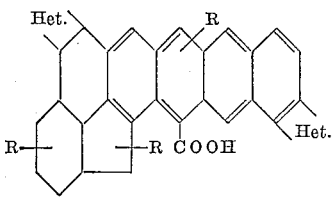

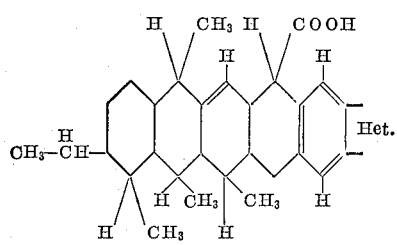

Dibasic acids

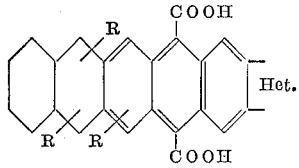

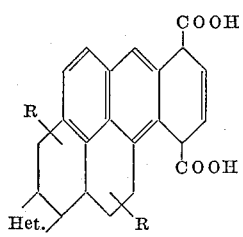

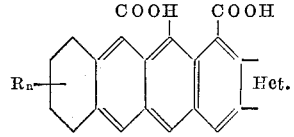

Tribasic acids

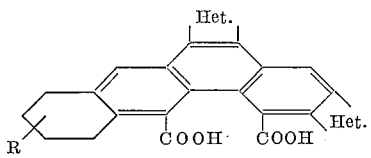

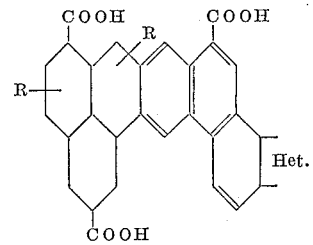

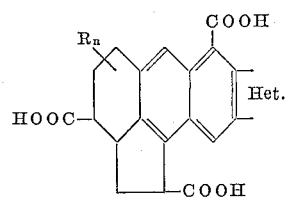

wherein "Het." illustrates one or more S-, N-, or O-containing heterocyclic ring substituents, R is an alkyl or cycloalkyl radical having a total of 5 to 22 carbon atoms for each nucleus, and $n$ has a value of 3 to 10. The molecular weight of the extract acids ranges from about 300 to 750, and the average molecular weight is about 325–470. Table I gives representative physical and chemical properties of the carboxylic acids to be used in accordance with this invention.

TABLE I

| Property: | Value |
|---|---|
| Av. mol. wt. range | 325–470. |
| Melting point °C. | 60–100. |
| Bromine No. | 4–24. |
| Percent sulfur | 1.05–4.45. |
| Color | Deep red-dark brown. |
| Percent unsaponifiables | 2–8. |

In the mixture of acids produced by metalation, carbonation, and acidification of solvent extracts, the mono-basic acid derivatives constitute from 5–95% by weight and the polybasic acids, that is those acids containing from 3 to as high as 7 carboxyl groups, make up from 0 to 20% by weight. In the preferred embodiment of the invention, the mixture of acids produced by metalation, carbonation, and hydrolysis or acidification of solvent extracts from the manufacture of refined mineral lubricating oils may be used, although fractions of such acids, such as those prepared by the method of copending applications, Serial Nos. 161,355 now Pat. No. 3,228,963, 209,741, now abandoned, 209,780, now Patent No. 3,180,876, and 247,358 may also be used.

Since the preferred source material, namely solvent extracts from the manufacture of mineral lubricating oil, does not lend itself to economical production of the desired complex acids using the prior art methods, the preferred methods of preparation set forth in said copending applications will be described and the properties of the acids set forth as examples. The details of these processes as described in said copending applications are incorporated herein by reference.

One procedure is to react about 30 parts of a petroleum fraction rich in complex polynuclear aromatics, as exemplified by solvent extract oils, with 1 to 5 parts of an alkali metal, such as sodium, potassium, cesium, lithium, and rubidium, and their mixtures and amalgams, at a temperature of about −60° to 80° C. in the presence of a reaction solvent such as dimethyl glycol ether, dimethyl ether, methylalkyl ethers, dialkyl glycol ethers, tetrahydrofuran, methylal, and trimethylamine. The formation of the adduct is promoted by shearing and agitation, providing an excess of alkali metal, using a pre-formed dispersion of the alkali metal in an inert solvent, or using a pre-formed dispersion of the alkali metal in a portion or all of the solvent extract. These techniques overcome the induction period of the reaction due to impurities, including sulfur compounds present therein, which tend to coat the alkali-metal particles and prevent the reaction or prolong the induction period. A Brookfield counter-rotating stirrer is used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about −20° C. to −80° C., causing a discharge of the color. This forms the alkali-metal salt of the complex acid which, upon acidification with a mineral acid, yields the desired complex, polynuclear, carboxylic acids in good yields. To illustrate, the following non-limiting examples are given.

*Example I*

One hundred gms. of extract oil No. 19 (Table III) from the preparation of 170 vis., 100 VI neutral oil, dissolved in 675 cc. of dry tetrahydrofuran, was reacted with agitation at 10° to 30° C. with 8.3 gms. of metallic sodium in the form of $\frac{3}{16}''$ cubes. After 25 minutes, adduct-formation began and a strong color change took place. The product was cooled to −60° C. while an excess of carbon dioxide gas was introduced, resulting in a discharge of the color without precipitation. The 5.1 gms. of unreacted sodium was removed, the tetrahydrofuran was vacuum-stripped therefrom, and the remaining liquid combined with ether and water-washed. Acidification of the aqueous phase and further ether washing resulted in the recovery of the free acids. About 11% of the solvent extract had reacted. The acid product had an indicated average molecular weight of 686, a saponification value of 171, and a calculated equivalent weight of 328, indicating an average of 2.1 carboxyl groups per molecule.

*Example II*

One hundred gms. of extract oil No. 19 (Table III) and 675 ml. of dry tetrahydrofuran were charged to a one-liter, 3-necked flask equipped with a stirrer, thermometer, pressure-equalized drop-funnel, gas inlet with rotameter, and gas outlet. A dry nitrogen atmosphere was maintained in the flask. Approximately 100 gms. of Alundum balls, $\frac{5}{16}''$ in diameter, were charged and agitation started. The solution was cooled to −20° C. and 8.3 gms. of sodium as a 20% dispersion in toluene were added. After an induction period of about 5 minutes, the solution was warmed, and at −7° C. the reaction began; in 17 minutes it was proceeding rapidly. An excess of dry carbon dioxide was added at −80° C. over a period of 78 minutes. The reaction mass was worked up as in Example I after the excess sodium was destroyed with water. About 15% of the extract oil reacted, and 22.5 gms. of extract acid were recovered having a saponification value of 241, indicating an equivalent weight of 233. The acid product contained 2.8% sulfur.

*Example III*

The process of Example II was repeated producing complex acids having a saponification value of 323, an indicated equivalent weight of 173, an indicated average molecular weight (cryoscopic) of 600, and containing 3.0% sulfur. The ratio of molecular weight to equivalent weight was 3.5 indicating a mixture containing acids with more than two carboxyl groups per molecule on the average.

*Example IV*

The various recovered acids of application Serial No. 819,932, illustrated in Table II therein, are further examples of carboxylic acids to be used to prepare the modified epoxy resins to be used as adhesive agents in accordance with this invention.

*Example V*

The various carboxylic acid products described in Runs 12 through 47 of application Serial No. 79,661 are further examples of acids that may be used.

In order to further illustrate the complexity and types of carboxylic acids that can be used in accordance with this invention the following tabulation is given:

TABLE II.—TYPICAL PROPERTIES OF A NUMBER OF EXAMPLE COMPLEX ACIDS (EPA)

| No. | Sap. Value | Mol. Wt. | Percent S | Br. No. | Percent Unsap. | Eq./Wt. | Eqs./Mol. | Acid No. |
|---|---|---|---|---|---|---|---|---|
| 1 | 171 | 685 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 4.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 211 |
| 46 | | 390 | | | 4.2 | | | 197 |
| 49 | | 365 | | | 5.4 | | | 218 |
| 51 | | 455 | | | 5.5 | | | 186 |
| 53 [1] | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |
| 101 | | 405 | | | 9.0 | | | 168 |
| 102 [2] | | 320 | | | | | | 240 |

[1] This EPA was used in the examples set forth herein.
[2] Prepared from decant oil, API gravity 15.40°; RI 1.5425; this acid No. 102 contained about 1.5 carboxyl groups per molecule.

The starting material for the reaction to prepare the complex carboxylic acids may be complex, polynuclear, and/or heterocyclic aromatic hydrocarbons of synthetic or natural source selected from the group of solvent extracts obtained in the solvent refining of mineral lubricating oils, hydrogenated solvent extracts, fractions of solvent extracts, FCC recycle stock, and decant oil from FCC processes, to be described. A preferred and unique source of aromatic starting material comprises petroleum fractions rich in more complex, polynuclear, aromatic hydrocarbons, not only because the mono-, di-, and polybasic acids products therefrom have unique properties, but also because the techniques outlined herein are particularly adapted to processing these more complex and resistant source materials. Illustrating the preferred and novel starting materials is the class known as solvent extracts from the manufacture of mineral lubricating oils, which solvent extracts are rich in complex, polynuclear, aryl, alkaryl, condensed ring and heterocyclic nuclei forming the organic portion of the carboxylic acids, or their mixtures, used in accordance with this invention. Solvent extracts from the manufacture of bright stock and neutral lubricating oils are particular examples of such fractions rich in complex aromatic compounds obtained as by-products from the solvent refining of mineral oil.

Since the general process of refining mineral lubricating oils in which solvent extracts are obtained is well known, and is related in detail in said copending applications, e.g., application Serial No. 162,279 it is only necessary for present purposes to give some examples by way of illustration. Following are the physical characteristics of typical extract products, from lubricating oil stocks derived from various crude oils and other source hydrocarbon materials, which may be used to prepare extract acids for modifying epoxy resins to be used as adhesive adducts for the compositions of this invention.

TABLE III.—SOURCES AND PHYSICAL CHARACTERISTICS OF SOLVENT EXTRACTS

| Ext. No. | Crude Source | Solvent | API Grav. | Sp. gr. at 10° F. | Vis./100° F. | Vis./130° F. | Vis./210° F. | V.I. | °F. Pour | °F. Flash | °F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.66 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.23 |
| 5 | do | do | 55.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.88 |
| 9 | Santa Fe Springs | do | 10.2 | | | | 371 | | +65 | 520 | 600 | 69.4 | | |
| 10 | Texas | Furfural | 13.0 | 0.9791 | | | 1,500 | | +85 | 470 | 515 | 57.1 | | |
| 11 | Penn | Chlorex | 12.2 | 0.9843 | | | 1,365 | | +85 | 560 | 630 | 71.4 | | |
| 12 | Penn | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | Mid-Cont | Phenol | 13.6 | | | | 41.7 | −82 | +20 | | | | | |
| 15 | Mid-Cont | Chlorex | 13.6 | | | | 200 | −61 | +75 | | | | | |
| 16 | Mid-Cont | Phenol | 8.9 | | | | 569 | | +75 | | | | | |
| 17 | Mid-Cont | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.8 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 23 | do | do | | | | | | −55 | +70 | | | | 1.1 | 2.75 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 vis. neutral, had an average molecular weight of 590, and contained 76.8% aromatics (by the silica gel procedure).

Extract No. 42 was obtained in the production of 150 vis. bright stock, had an average molecular weight of 590, and contained 86% aromatics, 14% saturates, 86.2% carbon, and 11.4% hydrogen, and averaged 3.3 aromatic rings per aromatic molecule.

Extract No. 43 was obtained in the production of 170 vis. neutral, had an average molecular weight of 340, contained 87.0% aromatics, 13% saturates, 86.4% carbon, and 10.7% hydrogen, and averaged 2.7 aromatic rings per aromatic molecule.

Extract No. 44 was obtained in the production of 200 vis. neutral, had an average molecular weight of 340, and contained 87% aromatics and 13% saturates.

Extract No. 45 was obtained in the production of 160 vis. bright stock and contained 92% aromatics and 8% saturates.

The solvent extracts from lubricating oils used as starting materials for this invention have the following general properties and characteristics.

TABLE IV

| Characteristic: | Range of value |
|---|---|
| Gravity, °API | 7.3– 18.3 |
| Gravity, sp., 60/60° F. | 0.945– 1.022 |
| Viscosity SUS @ 210° F. | 40– 1500 |
| Viscosity index | −128– +39 |
| Pour point (max.), °F. | +35–+100 |
| Molecular weight, average (above 300) | 320– 750 |
| Boiling point (initial), °F. | 300– 1000 |
| Boiling point (end), °F. | 400– 1200 |
| Sulfur, percent wt. (total) | 0.5– 4.5 |
| Sulfur compounds percent by vol. | 20– 50 |
| Aromatic compounds | 25– 90 |
| Neutral aromatic hydrocarbons | 40– 51 |
| Av. No. of rings/mean arom. mol. | 1.7– 5.0 |

For purposes of this invention the complex carboxylic acids are defined as being produced by metalation, carbonation and acidification of a source of complex high-molecular-weight polynuclear aromatic and heterocyclic compounds of petroleum origin containing sulfur, said acids having molecular weights of about 350, have at least one carboxyl group and preferably have 2 to 7 carboxyl groups or contain about 35% of dibasic acids, contain about 1.0 to 4.5% by wt. of sulfur and have nuclei which have about 1.7 to 5.0 aromatic rings per mean aromatic molecule.

The complexity of the types of compounds present, as based on these analyses, is illustrated by the following table:

TABLE V.—ESTIMATED CHEMICAL COMPOSITION OF SOLVENT EXTRACTS NOS. 19, 21, 43 AND 44 OF TABLE III

| Type of compound: | Approx. percent in the extract |
|---|---|
| Saturated hydrocarbons | 12.5 |
| Mononuclear aromatics—Substituted benzenes | 25.0 |
| Dinuclear aromatics—Substituted naphthalenes | 30.0 |
| Trinuclear aromatics— | |
| Substituted phenanthrenes | 10.0 |
| Substituted anthracenes | 5.0 |
| Tetranuclear aromatics— | |
| Substituted chrysenes | 00.5 |
| Substituted benzphenanthrenes | 0.2 |
| Substituted pyrenes | 0.2 |
| Pentanuclear aromatics—Perylene | 0.01 |
| Sulfur compounds, [1]oxygen compounds, etc. | 16.5 |

[1] Mainly heterocyclic compounds. The average mol. wt. of Extracts 19 and 21 is 340, and that of Extract 20 is 590.

Any portion of the reactive aromatic constituents in solvent extracts may be isolated therefrom, or from other sources, to be used as starting materials for the reaction in accordance with this invention. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material for economic reasons.

The solvent extract starting material may be vacuum-distilled, dewaxed and/or clay-contacted and/or hydrogenated, prior to use in preparing the complex carboxylic acids from which the selected fractions used in accordance with this invention are derived. Dewaxing can be accomplished by known methods, e.g., treatment with 45% MEK and 55% toluene as the dewaxing solvent, using temperatures in the order of −10° F., and solvent/solvent extract ratios of about 8/1. This treatment results in a dewaxed extract which has a pour point of about +5° F. and results in the removal of about 2% wax having a melting point of about 130° F. Clay-contacting can be accomplished by known methods.

The preparation of hydrogenated extracts is accomplished using known methods of hydrogenation, particularly mild hydrogenation; thus a preferred method of preparing hydrogenated extracts is to hydrogenate the distillate lube oil or residual oil before the extraction by treatment with hydrogen at 100-50 p.s.i.g. using temperatures of 530–600° F. in the presence of a molybdena-silica-alumnia catalyst. This same method can be applied to the solvent extracts per se, that is after the separation from the raffinate.

Hydrogenation has been found to result in the decarboxylation of any naphthenic acids present and the production of an extract from which complex acids of enhanced properties can be obtained by metalation, carbonation, acidification and fractionation.

Other known methods of hydrogenation can be applied to the solvent extracts using such catalysts as Filtrol, cobalt-molybdate, silver-molybdate and Porocel. The characteristics of a representative hydrogenated dewaxed and clay-contacted solvent extract are ° API, 9.5; color, NPA, 7; flash (COC), 420° F.; fire (COC), 465° F.; pour point, −5° F.; vis. @ 100° F., 1075 SUS; vis. @ 210° F., 58.5 SUS; VI, −96; neut. No. (1948), 0.05; sulfur, 2.60 wt. percent and C.R. percent, 0.01.

The catalytic cracking of those fractions of crude petroleum oils between diesel burning oil and vacuum residuals furnishes sources of complex, high-molecular weight polynuclear aromatic and heterocyclic compounds utilizable as alternate feed materials for the preparation of the complex carboxylic acids and the novel activator products of this invention. The Orthoflow Fluid Catalytic Cracking process of the M. W. Kellogg Co. is illustrative wherein any of the heaviest virgin gas oils that do not contain excessive heavy metal contents (which cause catalyst poisoning) are treated to fluid catalytic cracking to produce gasoline, heating oils, heavy fuel oils, and fuel gas. During the process at least two by-product streams are produced which are sources of complex polynuclear aromatic sulfur-containing compounds that can be utilized in acordance with this invention, namely, the heavy FCC cycle stock (or so-called heavy gas oil) and the decant oil. The prepartion of these by-product streams is illustrated as follows, said description is not to be construed as limiting and it is to be understood that other catalytic cracking processes can be used to produce similar by-product streams.

In a typical operation, mixed reduced crudes and several virgin gas oil streams comprising as many as 12 different feed components such as light vacuum distillates and heavy vacuum distillates, from FCC feed preparation units, solvent extracts from the preparation of neutral and light stock lubricating oils (as herein defined) and heavy virgin distillates i.e., heavy gas oils from the distillation of crude oils, in an amount of about 23,750 b.p.s.d., is preheated by exchange and sent to the Orthoflow converter equipped with reaction, catalyst stripping, air regeneration and catalyst circulation facilities. The cracked hydrocarbon vapors, steam and inert gas are sent to the base of a fractionator tower wherein the vapors are cooled and washed free of catalyst. Sufficient cooling is accomplished by the circulation of bottoms reflux over baffles, and by downflow from the tray above, to desuperheat the entering material and to condense the slurry recycle and decanted oil. Heat recovered from the tower by the slurry reflux is used for reboiling in the recovery and catalytic polymerization sections, for preheating fresh feed and for the generation of steam in a waste heat boiler.

The slurry settler in the base of the fractionator, separated therefrom by a solid internal head, is fed by the slurry reflux pump. Decanted oil is recycled to the base of the fractionator in order to maintain a low concentration of catalyst in the slurry reflux. The net decanted oil flows through a cooler and is pumped to storage while the thickened slurry flows into the stream of recycle gas oil returning to the reactor inlet. Both a light gas oil (herein referred to as light FCC recycle stock) and a heavy gas oil (herein referred to as a heavy FCC recycle stock) are withdrawn at appropriate trays of the fractionator. The tray between the top of the scrubbing section and the heavy FCC cycle stock drawoff pan removes any entrained slurry reflux or catalyst that may carry over. Above this tray the total drawoff pan collects the heavy FCC cycle stock for removal from the tower and recycle to the reactor and as reflux to the tower. A portion of this stream after cooling, is sent to storage. Light gas oil product, lean oil, gland oil, overhead vapors and gas streams are recovered in the upper sections of the tower, and separately processed, i.e., the gas from the process is compressed subjected to catalytic polymerization. The 23,750 b.p.s.d. of feed produces about 11,506 b.p.s.d. of gasoline, 2,381 b.p.s.d. of heating oil, 8,944 b.p.s.d. of heavy fuel oil and 1,263 b.p.s.d. of fuel gas.

In the treatment of 17,750 b.p.s.d. of fresh feed comprising distillates using a synthetic cracking catalyst at 900° F., 70% conversion at 1.5 through-put ratio (total charge divided by fresh feed) about 2,840 b.p.s.d. of $C_4$ hydrocarbons, 8,700 b.p.s.d. of $C_5$–400° gasoline, 4,438 b.p.s.d. of 400-600° light FCC cycle stock and 887 b.p.s.d. of decant oil is produced.

To illustrate, 17,004 b.p.s.d. of fresh feed and 4,253 b.p.s.d. of vacuum heavy gas oil from the vacuum tower (total 21,257 b.p.s.d.) is subjected to fluid catalytic cracking at about 900–880° F. using a standard cracking catalyst at a catalyst to oil ratio of about 8.4/1, space velocity of about 2.4 to produce 4,152 b.p.s.d. of light catalytic distillate, 7,516 b.p.s.d. of heavy gas oil recycle, 1,920 b.p.s.d. of decanted oil and 497 b.p.s.d. of net slurry recycle. The characteristics of the heavy cracked gas oil and decanted oil are shown in the following table.

TABLE VI.—PRODUCT CHARACTERISTICS

|  | Heavy FCC Recycle Stock | | Decanted Oil | |
| --- | --- | --- | --- | --- |
|  | No. 1 | No. 2 | No. 1 | No. 2 |
| Distillation: | | | | |
| ASTM D-1160 at 10 MM: | | | | |
| IBP, ° F | 151 | 173 | 177 | 198 |
| 5% | 299 | 305 | 351 | 346 |
| 50% | 368 | 369 | 455 | 449 |
| 95% | 429 | 433 | 644 | 645 |
| EP | 484 | 481 | 680 | 663 |
| ASTM D-1160 at 760 MM: | | | | |
| IBP, ° F | 367 | 394 | 399 | 425 |
| 5% | 549 | 556 | 611 | 605 |
| 50% | 632 | 633 | 734 | 727 |
| 95% | 734 | 740 | 949 | 950 |
| EP | 767 | 767 | 989 | 970 |
| ASTM D-158: | | | | |
| IBP, ° F | 479 | 462 | | |
| 50% | 616 | 618 | | |
| EP | 712 | 712 | | |
| Viscosity, $C_s$ at— | | | | |
| 100° F | 6.16 | 6.16 | [1] 22.0 | [1] 22.7 |
| 130° F | 4.04 | 4.05 | 11.73 | 11.87 |
| 210° F | 1.88 | 1.89 | 3.74 | 3.76 |
| RI at 67° C | 1.4958 | 1.4965 | 1.5525 | 1.5520 |
| Pour Point, ° F | +50 | +50 | +80 | +80 |
| Sulfur, wt. percent | 0.59 | 0.59 | 0.97 | 0.90 |
| Nitrogen, wt. percent | 0.02 | 0.02 | 0.03 | 0.03 |
| CR | 0.14 | 0.14 | 1.62 | 1.67 |
| Bromine No | 2.8 | 2.7 | 7.9 | 8.0 |
| Aniline Point, ° F | 155.0 | 154.0 | 154.0 | 153.0 |
| ° API | 26.2 | 25.7 | 14.8 | 14.6 |

[1] Extrapolated values.

The catalyst used in these experiments was a silica-alumina fluid cracking catalyst.

The heavy cracked gas oil or heavy FCC cycle stock and decanted oil products above are illustrative of sources of complex high-molecular-weight polynuclear aromatic compounds to be used to prepare complex carboxylic acids from which the polyester resins of this invention are derived. These feed sources can be treated in a manner to increase the aromaticity or extract the complex aromatic compounds therefrom, for use in the metalation reaction, i.e., by solvent extraction with the known solvents (described herein) for this purpose.

For the FCC recycle stock this is illustrated by the 19% extract (phenol solvent) thereof, which extract had the following properties: ° API, 1.8; sulfur, 1.9 wt. percent; Br No., 17; RI (20° C.) 1.6372, and Engler distillation, —I.B.P.=589° F.; 90%—745° F. The use of these latter starting materials is described in copending application Ser. No. 76,661.

The results of hydrogenation of several of the solvent extracts shown in Table III to produce hydrogenated or dewaxed and hydrogenated solvent extracts as starting materials for the preparation of the complex acid mixture and subsequent ester preparation are shown in Table VI.

solvent extracts obtained in the production of bright stocks probably contain more highly condensed aromatic structures. Most of the sulfur is in the form of heterocyclic rings with carbon, associated with both the aromatic-type and naphthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration) percent $C_n$ (carbon atoms in naphthenic configuration) and percent $C_p$ (carbon atoms in paraffinic configuration) gives results ranging from about 30–40% $C_a$, 20–35% $C_n$, and 31–47% $C_p$ using the method of Kurty, King, Stout, Partikian and Skrabek (Anal. Chem. 28, 1928 (1956)). They are soluble in ethyl ether, acetone, methyl ethyl ketone, tetrahydrofuran, benzene, toluene and xylene.

THE RESINS AND THEIR PREPARATION

The polyesters used in accordance with this invention are described in said copending application Serial No. 247,515, filed December 27, 1962. These polyesters are prepared from the afore-described complex polycarboxylic acids derived from said sources of complex polycyclic

TABLE VII.—HYDROGENATION OF SOLVENT EXTRACTS AND PRODUCTS

| Run No. | 1 | 2 | 3 | 4 | 5 | 6 | 7 | 8 | 9 | Range of Conditions and Product Properties |
|---|---|---|---|---|---|---|---|---|---|---|
| Reaction Conditions: | | | | | | | | | | |
| Extract No. | 43 | 44 | 44 | 44 | 41 | 43 | [1] 43 | 44 | [1] 44 | |
| H/HC ratio | 2.0 | 2.0 | 2.5 | 2.5 | 1.75 | 1.03 | 2.0 | 2.0 | 2.02 | 1.0–2.5 |
| LVHSV | 2.15 | 2.05 | 2.0 | 1.95 | 2.0 | 2.0 | 2.0 | 1.97 | 2.0 | 1.9–2.5 |
| Temp., ° F | 700 | 700 | 650 | 650 | 650 | 675 | 700 | 700 | 720 | 650–720 |
| Pressure, p.s.i.g | 500 | 500 | 400 | 300 | 400 | 400 | 500 | 500 | 500 | 300–500 |
| Catalyst | ([2]) | ([2]) | ([2]) | ([2]) | ([2]) | ([2]) | ([2]) | ([2]) | ([2]) | ([2]) |
| Products: | | | | | | | | | | |
| Neut. No. | 0.13 | 0.14 | 0.52 | 0.96 | 0.11 | 0.66 | 0.24 | 0.08 | 0.15 | .08–1.0 |
| Sulfur (wt. percent) | 2.4 | 3.19 | 3.07 | 3.05 | 1.75 | 2.7 | 2.6 | 2.7 | 2.7 | 1.5–3.5 |
| Grav., ° API | 12.8 | 9.4 | 8.5 | 8.8 | 18.5 | 11.8 | 12.9 | 10.1 | 9.7 | 8.0–15.0 |
| Vis. at 100° F | 663.7 | 1,133 | 1,457 | 1,452 | 132.5 | 808.7 | 851.1 | 464 | 1,058 | 450–1500 |
| VI | −33 | −96 | −115 | −114 | −9 | −49 | −52 | −83 | −96 | −120 to −9 |

[1] Dewaxed.
[2] Filtrol.

Table VI also sets forth the range of conditions and product properties that are generally applicable in the preparation of hydrogenated solvent extracts as starting materials in the preparation of the complex acids to be used in this invention.

Another typical example of an FCC decant oil is one having an API gravity of 15.4°, I.B.P. 375° F. and E.P. 995° F. at atmospheric pressure, cs. vis. @ 100° F. 21.00, cs. vis. @ 210° F. 3.66, percent S 0.870, Ramsbottom C 1.70, mol. wt. 320, vis. gr. con. .945, Br No. 8.0. The 47 vol. percent extract from this decant oil has a specific gravity of 1.095, exhibits the same initial boiling point and end boiling point and has the following characteristics: cs. vis. @ 100° F. 223.5, cs vis. @ 210° F. 7.80, percent S 1.44, Ramsbottom C 5.7, vis. gr. con. 1.103, Br No. 14.0, which is another species of the starting material.

Without limiting the invention, the characteristics of the adhesive-cohesive products of this invention as influenced by the complex acids are further disclosed as thus far evaluated. The carboxylic acids used are mixtures of acids of the dihydronaphthalene, dihydrophenanthrene, and dihydroanthracene types, having several alkyl groups and/or cycloalkyl groups in each aromatic nucleus wherein the sum of the carbon atoms in the alkyl and cycloalky substituents varies between 5 to 22. Despite the size of the acid molecules the linkages through or between the carboxyl groups are about the same as those of phthalic and terephathalic acids. A portion of the aromatic rings or condensed aromatic rings are probably further condensed with naphthenic rings to form configurations similar to the steroid ring systems. Extract acids from nuclei of heterocyclic nature by reaction of the complex acids with glycols or polyols and unsaturated dibasic acids or their anhydrides (one or both of the glycol or dibasic acids being unsaturated) under esterification conditions to form ester products ranging from liquids to solids. The complex unsaturated polyesters so prepared and used in this invention are fluid or liquid esters and are not copolymerized with styrene or any other unsaturated monomer to form solid products which obviously would not be suitable as lubricant constitutents.

The liquid polyesters used in the compositions of this invention are prepared using the known prior art methods or the methods disclosed in copending applications bearing Serial Nos. 55,123, now Patent No. 3,129,192, 79,541, 79,506 and 79,498, now Patent No. 3,222,307, using the following outline:

(1) Complex carboxylic acids+an unsaturated dibasic acid+a saturated glycol or saturated polyol or mixture of said glycols and polyols.

(2) Complex carboxylic acids+saturated dibasic acid +an unsaturated glycol or an unsaturated polyol or mixture of said glycols and polyols, and (3) Extract polycarboxylic acids+an unsaturated dibasic acid+an unsaturated glycol or an unsaturated polyol or mixture of said glycols and polyols.

In the foregoing outline the extract polycarboxylic acids can be a mixture of mono-, di-, and polycarboxylic acids as produced through metalation, carbonation, and acidification of the starting materials such as solvent extracts, or any fraction thereof; which predominates in di-, or polycarboxylic acids, i.e., has about 10% by weight or less of monocarboxylic acids. The saturated or unsaturated dibasic acids also include their anhydrides and various mixtures thereof. Similarly the saturated or unsaturated glycols or polyols may be in the form of mixtures or relatively pure compounds.

In reacting a complex mixture of polyfunctional reactants as contemplated by this invention under the foregoing outline, several polyester reactions take place simultaneously and the following formulae show some of the possible structures.

Thus, one combination of reagents may produce fluid polyesters or partly polymerized polyesters having the general formula showing the excess carboxyl groups as terminal groups.

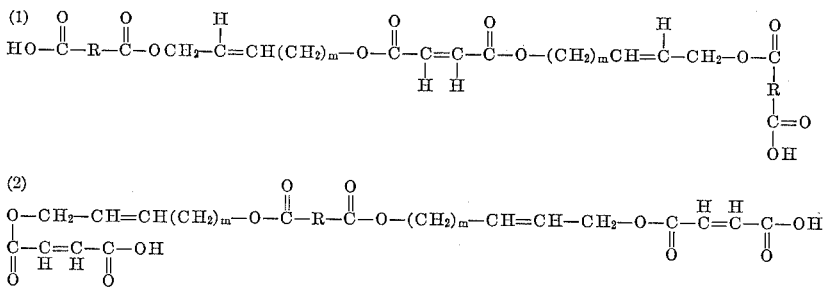

wherein R is the complex, condensed-ring, high molecular weight radical of said extract polycarboxylic acid, here represented as having two carboxyl groups, the polyol is an unsaturated glycol, and m has a value of 1 to 10. Maleic anhydride is used here to represent any unsaturated dibasic acid.

The position of the double bond in the glycol molecule is immaterial and in fact the glycol may be completely saturated.

In another combination of reagents used to produce these fluid adhesive polyesters, we can substitute saturated glycols for the unsaturated and a saturated dibasic acid to replace maleic acid. The structural formulae would be exact analogues of Formulae 1 and 2.

From the foregoing it is apparent that the finished products of this invention have the following units:

(a) For extract polycarboxylic acids which are predominantly dibasic:

(3)

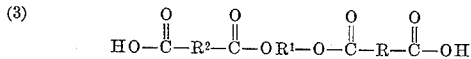

where $R^1$ is a saturated diol; R is extract dicarboxylic acid and $R^2$ is an unsaturated dibasic acid;

(4)

where $R^1$ is saturated diol and $R^2$ is an unsaturated dibasic acid;

(5)

where $R^1$ is unsaturated diol and $R^2$ is saturated dibasic acid;

(6)

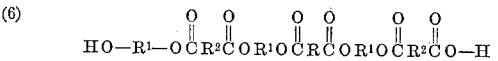

where $R^1$ and $R^2$ are both unsaturated.

(b) For extract polycarboxylic acids which contain monobasic, dibasic, and tribasic acids:

(7)

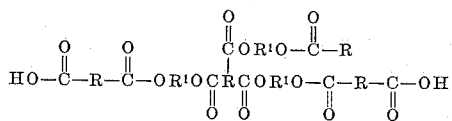

where $R^1$ is unsaturated diol and R can be monobasic, dibasic and tribasic extract acid;

(8)

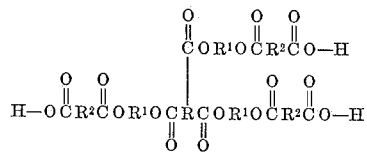

where $R^1$ is saturated and $R^2$ is unsaturated, etc., the other modifications of Formulae 4, 5 and 6 being obvious from the above. From the above structures, it should be carefully noted that every molecule shows at least one unreacted carboxyl group. Mol ratios of total acids to total glycols used in the reaction should be so arranged as to leave excess carboxyl groups unreacted. This is an essential and most important feature of this invention as a distinction from other polyester disclosures where hydroxyl groups are always in excess.

To illustrate the complexity of the polymers formed where the EPA is tricarboxylic, the polyol is trihydric and both the polyol and dibasic acid are unsaturated the formula is representative:

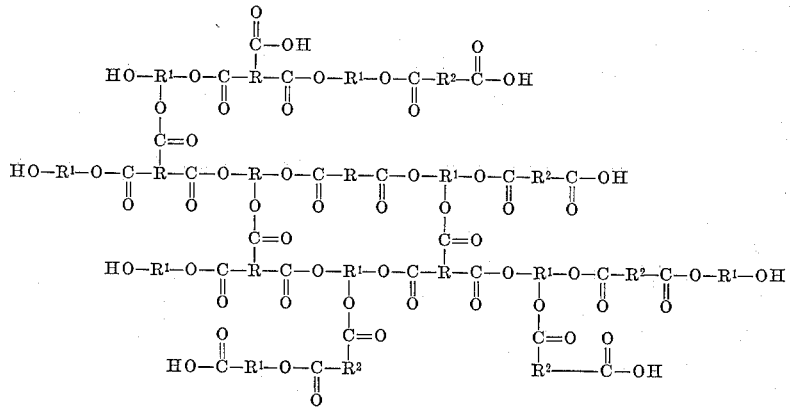

In all of the formulae infra, $R^1$ is a divalent hydrocarbon radical containing 2 to 20 carbon atoms and may be alkylene, arylene, alkarylene, aralkylene, and cycloalkylene in configuration, and $R^2$ is a divalent hydrocarbon radical containing 2 to 20 carbon atoms and may be alkylene, arylene, alkarylene, aralkylene, polyarylene (naphthylene) and cycloalkylene in configuration.

The adhesive compositions of this invention contain polyesters predominating in two or more combined polyesters of the Formulae 1 through 9.

The esters used in accordance with this invention are prepared with a facility by known esterification methods and conditions. It is only necessary to place the complex acids and the selected unsaturated or saturated dibasic acid and unsaturated or saturated glycol in a reaction vessel and heat same at least to the melting point of the reactants, and/or to a temperature sufficient to drive off the water of esterification from the reaction mass. Any solvent which is inert to the reactants and the products may be used as the azetroping solvent to remove water as the reaction proceeds. The use of catalyst is optional. In order to realize the maximum adhesive properties from these polyesters, it is essential that the total carboxyl equivalents should always exceed the total hydroxyl equivalents of the combined glycols. After reaction, this resulting polyester has at least one unreacted carboxyl group per molecule, or as much as 2 or 3 unreacted carboxyl groups if the polycarboxylic acid forming the nucleus of the polyester molecule is di- or tricarboxylic.

The polyester adhesive and cohesive resin products of this invention are more adhesive and cohesive than wood rosin and other prior art addends and represent an improvement over prior art resins prepared from saturated monohydric or dihydric alcohols and unsaturated dicarboxylic acids. This is apparently due to the complex polynuclear group present in the polycarboxylic acids derived from solvent extracts. As seen from this description dihydric alcohols are used to prepare the polyester adhesive resin products of this invention.

Any compound containing two or more reactive hydroxy groups can be used, such as, the $C_2$ to $C_{20}$ aliphatic diols including ethylene glycol, 1,2-propanediol, 1,2-butanediol,
1,3-butanediol, 1,4-butanediol,
2,3-butanediol, 1,2,4-butanetriol,
erythritol, 1,4-pentanediol,
1,5-pentanediol, 2,4-pentanediol,
1,2,5-pentanetriol, 2-methyl-1,4-butanediol,
2-methyl-2,3-butanediol, 2-ethyl-1,3-propanediol,
2,2-dimethyl-1,3-propanediol, pentaerythritol,
1,3-hexanediol, 1,4-hexanediol,
1,6-hexanediol, 2,5-hexanediol,
2-methyl-1,3-pentanediol, 4-methyl-1,4-pentanediol,
3-methyl-1,5-pentanediol, 2-methyl-2,4-pentanediol,
3-methyl-2,4-pentanediol, 3-methyl-2,5-pentanediol,
2-ethyl-1,3-butanediol, penacol,
penacol hydrate, 1,4-heptanediol,
1,7-heptanediol, 2,4-heptanediol,
3-methyl-2,4-hexanediol, 2-methyl-3,5-hexanediol,
1,2-octanediol, 1,8-octanediol,
2,4-octanediol, 5-methyl-2,4-heptanediol,
1,9-nonanediol, 1,10-decanediol,
1,2-octadecanediol and 1,20-eicosanediol.

Such alicyclic diols, having 5 to 12 or more carbon atoms as 1-(hydroxy methyl)-1-cyclobutanol,
cis-1,2-cyclohexanediol,
trans-1,2-cyclohexanediol,
cis-1,3-cyclohexanediol,
1-methyl-1,4-cyclopentanediol,
1,2-dimethyl-2,3-cyclopentanediol, are included.

Also the aromatic dihydroxy compounds of $C_6$ to $C_{26}$ carbon atom configuration such as o-dihydroxybenzene, m-dihydroxybenzene,
p-dihydroxybenzene, 1,2,4-trihydroxybenzene,
1,3,5-trihydroxybenzene, o-hydroxybenzyl alcohol,
m-hydroxybenzyl alcohol, p-hydroxybenzyl alcohol,
1,2,4-trihydroxybenzene, 0-hydroxybenzyl alcohol,
1-phenyl-,2-ethanediol, phthalyl alcohol,
γ-phenylpropylene glycol,
2-methyl-2-phenyl-1,3-propanediol, benzopinacol.

The poly lower alkylene glycols, polyglycols and the like may be used, to include, but not limited to $HOC_2H_4OH$, $H(OC_2H_4)_2OH$,
$H(OC_2H_4)_3OH$, $H(OC_2H_4)_4OH$, mixtures of the formula $H(OC_2H_4)_nOH$, where $n$ is an integer and ranging in molecular weight from about 100 to 4000 and higher, $HOCH(CH_3)CH_2OH$, $H(OCH(CH_3)CH_2)_nOH$ where $n$ is an integer from 2 to 50 or higher, the mixed polyglycols of molecular weights up to about 4000 or higher produced by the reaction of ethylene oxide or propylene oxide with propanol or butanol, $HO(CH_2)_3OH$ $HOC_6H_4$—$C_6H_4OH$, $C_6H_4(OH)_2$ (all isomers), $HOC_6H_4CH_2OH$ (all isomers), dihydroxynaphthalene, dihydroxyanthracene and derivatives of compounds of all of the classes illustrated which contain only inert substituents such as halogen, ether, or ester substituents, e.g.

$$HOCH_2CHBrOH$$
$$HOCH(CH_2Cl)CH_2OH$$
$$HOCH_2CH(OCH_3)CH_2OH$$
$$HO(CH_2CHClO)_nH$$

where $n$ is an integer of 1 to 50, $$HO(CH_2CH(OC_2H_9)CH_2O)_nH$$

where $n$ is an integer of 1 to 50, $$CH_3OC_6H_3(OH)_2$$
$$BrC_6H_3(OH)_2$$

and the like.

The unsaturated glycols are illustrated by the foregoing aliphatic diols containing at least one double bond, i.e. 4 methyl-2-pentyne-1,4 diol 3,5-octadiene-2,7-diol, 2,5-dimethyl-3-hexene-2,5-diol, 4-nonene-1,2-diol, to include the series of $C_4$ to $C_{20}$ aliphatic unsaturated diols, alicyclic olefinic diols, and the like.

The polyester intermediates are prepared by conventional esterification methods, with or without a catalyst. Any of the known esterification catalyst may be used to speed up the reaction, such as sulfuric acid, other mineral acids, boron trifluoride or other Lewis acids. A diluent such as an inert solvent may be used when convenient for lowering the reflux temperature and removing water as an azeotropic mixture. The reaction may be carried out at temperatures ranging from 100° to 200° C. and preferably 100° to 150° C.

The gear lubricant compositions of this invention are prepared by forming the polymerizable or monomeric polyester resin as heretofore described, and dissolving the polyester in the oleaginous vehicle solution or gear lubricant. The gear lubricant so formed is resistant against water, and does not deteriorate with age.

Saturated dibasic acids which are suitable for use in preparing the unsaturated polyester resins used in the gear oil compositions include, but are not limited to, the $C_2$ to $C_{20}$ aliphatic discarboxylic acids such as malonic, succinic, glutaric, methyl succinic, dimethylmalonic, adipic, pimelic, isopropylsuccinic, suberic, azelaic, sebacic, n-hexylsuccinic and 1,14-tetradicanedicarboxylic acid; the $C_5$ to $C_{13}$ alicyclic dicarboxylic acids such as 1,1-cyclopropane dicarboxylic acid, cyclohexyl malonic acid, cyclopentane-1,1-diacetic acid and trans-decahydronaphthylmalonic acid, the $C_8$–$C_{16}$ aromatic dicarboxylic acids, such as terephthalic acid, tetrahydrophthalic acid, phthalic acid, phthalic anhydride, isophthalic acid, homephthalic acid, tetrahydrophthalic acid anhydride, hexahydrophthalic acid and anhydride, endomethylene tetrahydrophthalic acid and anhydride, tetrachlorophthalic acid and anhydride and hexachloroendomethylene tetrahydrophthalic acid; the $C_4$–$C_{11}$ unsaturated dibasic acids (forming a preferred group) such as maleic acid, maleic anhydride, fumaric acid, fumaric anhydride, chloromaleic acid, chloromaleic acid anhydride, itaconic acid, itaconic acid anhydride, citraconic acid, citraconic acid anhydride, mesaconic acid and mesaconic acid anhydride. Preferred glycols include diethylene, triethylene, dipropylene, and tripropylene glycols, hydrogenated bisphenol-A, 1,6-hexamethylene glycol, etc. Less preferably, lower-molecular-weight glycols, such as ethylene glycol and propylene glycol, may be used.

The preparation of typical resins is illustrated by the following examples:

*Example VI*

249 grams (1 acid eq.) of complex acids (225 A.N.), 147 g. (3 acid eq.) of maleic anhydride, 106 g. (2.0 equivalents) of DEG and 75 g. (1.0 equivalent) of TEG are charged to a resin kettle with 50 ml. of toluene, esterified at 400° F., under a $N_2$ blanket until the acid number of the resin has diminished to about 25. Then the toluene is distilled from the mixture, and the product is cooled to form resin No. 1.

*Example VII*

Following the procedure in Example VI, 250 grams (1 acid eq.) of complex acid No. 53 (acid No. 255), 147 g. (3 acid eq.) of maleic anhydride, 110 g. (2.0 equivalents) of DEG and 75 g. (1.0 equivalent) of TEG are charged to a resin kettle with 50 ml. of toluene, esterified at 400° F., under an atmosphere of nitrogen until the acid number of the resin has diminished to about 30. The toluene is distilled off to form resin product No. 2.

*Example VIII*

Following the procedure in Example VI 264 g. of complex acids (EPA No. 53 of Table II), 71 g. TEG, and 104 g. DEG are esterified in the presence of quinone (0.18 g.) in a xylene solution at 450° F. Evaporation of the solvent produces resin No. 3.

*Example IX*

Following the procedure in Example VI, 250 g. of acid No. 101 of Table II, 75 g. of fumaric acid, 100 g. of tripropylene glycol and 71 g. of 1,6-hexamethylene glycol are reacted to form resin No. 4.

THE COMPOSITION OF THIS INVENTION

The lubricating compositions of this invention can contain any oleaginous vehicle and a sufficient amount of the polyester resin, generally between about 0.1 to 1.0 wt. percent to impart adhesiveness thereto. The superiority of the lubricants of this invention has been demonstrated experimentally by comparison of the results obtained with representative examples of them and of conventional, wood-rosin-containing lubricants in the U.S. Steel Retention test (Timken four-gram test) and the POCO Tac-Tension test.

In the four-gram test, four grams of the test lubricant are placed on the test cup and run under a beam load of 43 pounds until failure occurs. Two runs of 30 minutes (1800 seconds), or the longest run out of a series of three is the measured indication of retention ability. The purpose of the test is to simulate the lubrication of open gears operating for long periods without replenishment of the lubricant.

In the Tac-Tension test, a small steel plug is placed in a thin film of the test material, and the time required for the plug to be drawn free of the surface of the test material by an electromagnet is measured.

The compositions of the experimental and commercial lubricants, and the results obtained in the tests, were as follows:

TABLE VIII

| Components (percent w.) | Commercial Formulation | Composition 1 | Composition 2 |
|---|---|---|---|
| Asphalt | 32.0 | 32.0 | 32.0 |
| Bright Stock Extract | 35.0 | 39.0 | 38.5 |
| Neutral Extract | | 19.0 | 19.0 |
| 200/90 Neutral | 23.0 | | |
| Wax Tailings | 3.0 | | |
| PAD Resin | | 3.5 | 3.5 |
| Lead Naphthenate | 6.0 | 6.0 | 6.0 |
| Rosin K (Wood Rosin) | 1.0 | | |
| Polyester Resin No. 3 [1] | | 0.5 | 1.0 |
| Viscosity at 210° F., SUS | | | |
| Timken Four-Gram Test, sec | 1412, 1160, 1217 | 2122, 1800 | 2030, 1730 |
| Tac-Tension Value | 0.0622 | 0.071 | 0.067 |

[1] Polyester Resin No. 3, prepared as described in application Ser. No (499) had the following formulation:

| | Grams | Equivalents | Ratio |
|---|---|---|---|
| Complex Acids (EPA) | 264.0 | 1.007 | |
| Maleic Anhydride | 71.0 | 1.450 | 2.457 |
| Triethylene Glycol | 104.0 | 1.387 | |
| Diethylene Glycol | 21.0 | 0.394 | 1.8 |
| Quinone | 0.18 | | |
| Xylene [a] | | | |

[a] 60 ml. Evaporated at end of prep.

The afore-described unsaturated polyester resins are incorporated in the otherwise conventional gear lubricant or gear shield lubricant in concentrations ranging from about 0.1 to 1.0% by weight and preferably within the range of about 0.2 to 0.5% by weight. One aspect of this invention is that small quantities of the instant polymers are as effective or even more effective than conventional thickening or adhesive agents of the prior art, and form a superior, readily reproducible, adhesive, metal-adherent, tacky but fluid lubricant. The gear lubricants of this invention pass the U.S. Steel Retention test and the Timken four-ball test (described in copending application Serial No. 162,201, filed December 26, 1961, now Patent No. 3,222,280).

The lubricating oil used in the open gear lubricating composition of this invention can be any mineral lubricating oil or oleaginous equivalent. Preferably the mineral lubricating oil portion is a refined mineral lubricating oil which has been solvent extracted, dewaxed and clay treated. An illustration is the 200/90 neutral, the bright stock extract and the neutral extract used in the foregoing formulations exhibited the following properties:

TABLE IX

| | 200/90 Neutral | Bright Stock Extract | Neutral Extract |
|---|---|---|---|
| Gravity,° API at 60° F | 29.5 | 29.1 | 13.6 | 18.2 |
| Sp. Gr | 0.8789 | | | |
| Flash,° F | 435 | 430 | 560 | 375 |
| Fire,° F | 500 | 485 | 645 | 420 |
| Vis at 100° F., SUS | 201.9 | 208.5 | 26,650 | 154.1 |
| Vis at 130° F., SUS | 105.3 | 106.7 | [1] 870 | 80.8 |
| Vis at 210° F., SUS | 46.1 | 46.7 | 376.5 | 40.6 |
| Color (ASTM D-1500) | 1.5 | | | |
| Pour Point,° F | −5.0 | 0 | +75 | +40 |
| Vis. Index | 92 | 93 | 31 | −13 |
| Percent Sulfur | 0.33 | 0.38 | 2.24 | 1.86 |
| Neut. No | 0.03 | 0.03 | 2.5 | 3.70 |
| Carbon Residue | | | 5.6 | 0.1 |

[1] 180° F.

The wax tailings had a gravity, ° API at 60° F. of 6.5, a flash point of 470° F., a fire point of 595° F., a needle penetration of 44 and a softening point of 116.5° F. Wax tailings are known in the art and described in "Chemical Technology of Petroleum" by Gruse and Stevens, 2nd ed. 1942, page 419, as emanating from conventional batch operation of horizontal cylindrical shell stills, fired externally and operated at essentially atmospheric pressure. This product or residue is a sticky, viscous material, semi-solid when cold and considered to consist in compounds of the condensed aromatic type, such as chrysene and picene. This material is further described and illustrated in U.S. Patent 2,716,085 by G. W. Ayers and W. A. Krewer. The viscity of wax tailings can be as high as 14,500 SUS at 210° F. (ASTM D445). The lead naphthenate used in the examples set forth in Table VI is a proprietary product known as Carlisle's 30 ILV and incorporates a small amount of zinc dithiophosphate for better wear characteristics. The Rosin K had a sp. gr. of 1.07, a flash point of 400° F. and a softening point, R. & B. of 168. The neutral oil extract and bright stock extract are described in Patent 2,910,440, and any of the solvent extracts listed herein can be used in the compositions of this invention.

The PAD resin as described in Patent 2,910,440 comprises polymerized methyl esters of rosin obtained as a residue from the vacuum distillation of dark methyl ester of rosin. These materials have a mol. wt. of about 760, a melting point of 212° F. and an acid number of 15. The characteristics of PAD resin are shown in the following table:

TABLE X

| | Characteristics of Specific Example | Typical Range | Raw Materials Specifications |
|---|---|---|---|
| Color (1% in toluene (ASTM d-155-45T) | 3½+ | 3 to 5 | |
| Acid No. (ADCS Ka 2-55) | 18.5 | 15 to 20 | [1] 20 |
| Ash as Oxide (wt. percent) (ASTM D 482-46) | 0.66 | 0.50 to 0.70 | [1] 1 |
| Specific Gravity at 20/20° C. (ASTM D 1217-52T)[1] | 0.986 | 0.986 to 1.083 | |
| Organic Melting Point ° F. (AOCS CC 1-25) | 240 | 235-240 | 220-245 |
| Saponification No. ASTM D 94-52T | 31.3 | 31-34 | |

[1] Max.

In one aspect of this invention about 1.0 to 15% by weight of this resin is incorporated along with the partially polymerized resins described herein.

Lead naphthenate is a known ingredient for imparting extreme pressure properties. The characteristics of a typical product as used in the examples and in accordance with this invention are shown in the following table:

TABLE XI

[Lead naphthenate, 30% regular]

| | Specific Component | Typical Values | Raw Material Specifications |
|---|---|---|---|
| Lead, wt. percent (Wet Ash (SO₄) Gravimetric) | | 30.2 | 30.0±0.2 |
| Vis/210° F. SUS (ASTM D-445-53T) | | 372 | [1] 300 |
| Specific Grav. (ASTM D941-55) | | 1.369 | 1.350 |
| Flash Point ° F. (ASTM D92-52) | | 300 | [1] 300 |

[Lead naphthenate, 30 ILV]

| | | | |
|---|---|---|---|
| Lead Wt. percent | 28.1 | 28.5 | 28.0-29.0 |
| Zinc Wt. percent | 0.22 | 0.22 | 0.20-0.25 |
| Sulfur Wt. percent | 0.62 | 0.63 | 0.3-0.7 |
| Phosphorus Wt. percent | 0.19 | 0.19 | 0.15-0.25 |
| Vis./210° F. SUS | 511 | 368 | 300-500 |
| Spec. Grav. | 1.342 | 1.339 | 1.33-1.35 |
| Flash Point ° F. | 300 | 300 | [1] 300 |

[1] Min.

In addition to the other extreme pressure addends described herein, in place of all or part of the extreme pressure addend proportions of the compositions of this invention, any of the known metal salts that have this property may be used e.g., cobalt naphthenate, zinc naphthenate, copper naphthenate, lead dithiocarbamate, zinc dithiocarbamate, lead dithiophosphate and the like. The proportion of extreme pressure agent may vary from 0 to about 10% by wt.

The Rosin K is a wood rosin having the following characteristics:

TABLE XII

| | Specific Component | Typical Values |
|---|---|---|
| Flash Point, ° F | 400 | 400-420 |
| Sp. Grav | 1.07 | 1.065-1.070 |
| Softening Point, ° F. R. & B | 168 | 160-170 |
| Saponification No | 171 | 168-172 |
| Unsaponifiable, percent | 7 | |
| Refractive Index at 20° C | 1.5453 | |
| Acid No | 162 | |

In practice several grades of gear oils are prepared depending on their viscosities. As an example, one grade may have viscosity ranging from about 4450-4550 SUS at 210° F. (measured without solvent). For such a composition about 46% to 50% of asphalt and 34% to 36% of solvent extract would be used. Another grade of gear oil may have a viscosity of about 2200-2300 SUS at 210° F. Such a composition would contain about 35% to 37% asphalt or other equivalent material and 44% to 45% solvent extract. Still another grade of gear oil, have a viscosity of about 450 to 650 SUS at 210° F., would contain less amounts of asphalt and solvent extract as would the lowest viscosity grades of gear oil compositions. Where the use of a solvent such as naphthol (a fraction from the kerosene boiling range hydrocarbons) and other known diluents is necessistated for purposes of forming a composition that can be readily handled and applied to the gear surfaces, generally about 5 to 10% by wt. and preferably about 6.5% by wt. of said solvent is recommended. The solvent evaporates under ambient conditions and leaves a protective coating of the composition on the machinery surfaces. Accordingly, the asphalt content may vary from 30 to 50% by wt., the solvent extract content from 30 to about 60% by wt. (preferably about 58%) with the other ingredients, along with 0.1 to 1.0 wt. percent of the polymerized epoxy resin making up the balance.

The compositions of this invention need not contain the PAD resin or the Rosin K or the wax tailings. This is illustrated by the following examples of additional compositions coming within the scope of this invention.

TABLE XIII.—GEAR OIL COMPOSITIONS

| No. | Ingredient | Wt. Percent |
|---|---|---|
| No. 4 | Asphalt | 33.0 |
| | Extract No. 44 | 36.0 |
| | 200/90 Neutral oil | 24.5 |
| | Zinc naphthenate | 6.0 |
| | Reaction product of Exampe VI | 0.50 |
| No. 5 | Asphalt | 35.0 |
| | Extract No. 45 | 34.0 |
| | 200/90 Neutral oil | 23.5 |
| | Lead dithiocarbamate | 6.5 |
| | Reaction product of Example VII | 1.0 |
| No. 6 | Asphalt | 36.0 |
| | Extract No. 41 | 34.0 |
| | 200/90 Neutral oil | 22.5 |
| | Zinc dithiocarbamate | 7.4 |
| | Reaction product of Example VIII | 0.1 |
| No. 7 | Asphalt | 37.0 |
| | Extract No. 42 | 33.0 |
| | 200/90 Neutral oil | 21.5 |
| | Lead dithiophosphate | 8.3 |
| | Reaction product of Example IX | 0.2 |

The extreme pressure agents described in United States patents 2,968,619 by G. Bernard; 2,885,363, by G. Wolfram and J. B. Stucker; 2,900,342 by A. Manteuffel, G. Cook and W. Cortiss; 2,910,438 by P. Chapman and A. Manteuffel; 2,929,778 by A. Manteuffel, G. Ayers and W. Gilson and 2,830,952 by A. Manteuffel, E. Brennan and J. Stucker may be used. In addition various known viscosity-index improvers, pour-point depressants, foam depressants, rust inhibitors, e.g., such materials as polyisobutylene derivatives, polymerized esters or acrylic acids and higher fatty alcohols, mixtures of such esters (mol. wt. 5000 to 20,000), phenol-halogenated wax ester condensation products, dibenzyldisulfide, polyethylsiloxanes, and metal salts of petroleum sulfonic acids may be used in approximate amounts where desired.

The vehicle used in the compositions of this invention may be any natural or synthetic oleaginous material which will act to carry or suspend the resins therein. Preferably, the oleaginous vehicle is a viscous hydrocarbon oil or viscous residual oil obtained from the production of lubricating oils. The viscous oils which are used as the base for these adhesive lubricants may be the residues from the distillation of lubricating oils or preferably the solvent-extracts from the solvent refining of lubricating oils. These oils may be used alone or blended with other oils or with asphalt to produce base oils of the desired viscosity, which may then be provided with the desired adhesiveness by addition of the polymerized methyl esters of rosin.

In preparing adhesive lubricants of this type the various components are merely placed together in any conventional mixing apparatus that is capable of thoroughly mixing viscous fluids. The mixture is heated to an elevated temperature, usually about 300°–325° F., and thoroughly mixed. Conventional grease-compounding kettles are especially well suited for this purpose, since they are capable of imparting the high shear that is necessary for thorough mixing of viscous fluids.

Since the asphalt is normally solid it is incorporated, either in the form of chunks, or as a molten mass heated to about 350° F. in the solvent extract, and the mixture is heated to a temperature of about 200° to 300° F. The best procedure is to add the E.P. additive last and at a temperature below about 200° F., to avoid any possible reaction or destruction of the basicity of the additives.

The compositions of this invention may be used for wire lubricants and for lubricating exposed gears. The compositions pass the critical tests for such lubricants described in United States Patent 2,910,440. The viscosities of the finished products may be varied and in general may range from 450 to 5100 or above (SUS at 210° F.). Satisfactory lubricants can be made by using residual oils from the preparation of lubricating oils, e.g., tube-still bottoms, as in U.S. Patent 2,716,085, or a blend of solvent extracts, as described herein, with or without the addition of neutral oils. The bright stock extract used in the examples is comparable to Extract No. 42 of Table III. At concentrations above the amounts specified herein, the increase in adhesive properties is disproportionate to the added cost of the additive. At concentrations below these limits the adhesive characteristics are satisfactory, but decrease in proportion to the concentration of the additive. Thus, the lower concentrations of additives may be used for less viscous oils where less adhesion is required. In the formulation of less viscous adhesive oil compositions, in the general range of the composition 1, 2 and 3 disclosed, compositions including 30 to 35% by weight of asphalt, 30 to 35% by weight of solvent extract from solvent refining of 150 vis bright stock, 20 to 25% by weight of neutral oils and 0.10 to 1.00% of the novel reaction product disclosed herein may be used as satisfactory adhesive lubricants for the purposes indicated. The more viscous grades of adhesive lubricant compositions are prepared by blending 35 to 50% by weight of asphalt, 30 to 45% by weight of solvent extract from 150 vis bright stock manufacture, and 0.10 to 1.00% of the unpolymerized polyester EPA additive. As is apparent from the foregoing description, the exact ranges of percentages of the oil base, asphalt, and polymerized polyester EPA additive are not defined with exactitude since these proportions may be varied to produce lubricants of varying viscosity and adhesiveness, depending on the type of adhesive lubricant needed and the cost of preparing same.

The various percentages disclosed and used herein are merely illustrative and can be varied to account for the physical properties of the individual species of ingredients chosen. Where the lower percentages of both asphalt and solvent extracts are used in a composition, the balance of the oleaginous part of the composition is made up with a mineral lubricating oil or fraction thereof or a similar inert carrier liquid, also preferably having some lubricity, so that the specified ranges of E.P. agent, if used, and PAD resin, if used, can be incorporated with the modified resin adhesive agents of this invention. Where intermediate amounts of asphalt and extract are employed, the balance of the oleaginous part of the composition is adjusted downwardly, depending on the desired viscosity of the end product, so that the amounts of E.P. agent (when used) and the modified polyester resins adhesive agent of this invention when incorporated in the amounts herein specified gives the desired adhesion to the metal surfaces. And where the larger amounts of asphalt and extract are used together the omission of an additional oleaginous vehicle, such as neutral or bright stock oils, is contemplated, lesser amounts, in the order of 1–20%, may be used to adjust the viscosity of the end product, while using at least the minimum specified quantities of the modified polyester resin adhesive of this invention, with or without the PAD resin and E.P. agent.

For some applications, it is contemplated that other addends such as corrosion inhibitors, pour-point depressers, VI improvers and similar known addends be incorporated in place of or along with the PAD resin and/or E.P. agent. Thus, the invention is directed to a composition of matter comprising an oleaginous vehicle or viscous residual oil and a sufficient amount of a partially or wholly polymerized polyester resin or mixture of such modified resins as herein described, to impart adhesiveness to the composition. For this purpose, between about 0.1 to 1.0% by weight of the modified resin is used in the oleaginous vehicle or viscous residual oil, as demonstrated by examples similar to those described in the separate series of experiments herein.

In characterizing the complex acids derived from sulfur-containing aromatic compounds of petroleum origin to be used to prepare the polyester resins used in accordance with this invention their molecular weights, sulfur content, and average number of aromatic rings per mean aromatic molecule are the selected criterion. The predominantly dibasic acid fractions separated from the complex mixture formed in the metalation, carbonation and acidification reactions, may have acid numbers ranging from about 250 to 330 or higher. A relatively pure dibasic acid fraction has an acid number of about 280. The methods of separating the monobasic acids from the complex mixture are described in copending applications Serial Number 161,355, filed December 22, 1961; 209,741, filed July 13, 1962; 209,780, filed July 13, 1962; and 247,358, filed December 26, 1962. To illustrate a fraction separated by the process of application Serial No. 161,355 has an acid number of 389, contains about 2.80 carboxyl groups per molecule and has a mol. wt. of about 285. This fraction was obtained from an original complex acid mixture having an acid number of 218, mol. wt. 420 and containing about 1.66 COOH groups per molecule. The molecular weights of some dibasic acid fractions, as for example those obtained by the process of application Serial Number 209,741, range from about 420 to 435 with acid numbers in the range of 280 to 300. The fractions separated by the process of application Serial Number 247,358 are amber color, crystalline, have acid numbers of about 245–309 and equivalent weights of 181 to 296.

The embodiments of this invention in which an exclusive property or privilege is claimed are defined as follows:

1. An adhesive lubricating composition comprising a mineral lubricating oil and a fluid polyester formed by the reaction of (1) complex carboxylic acids obtained by metalation, carbonation and acidification of aromatic compounds that are characterized by containing about 0.5 to 4.5 weight percent of combined sulfur, about 1.7 to 5.0 aromatic rings per mean aromatic molecule and molecular weights of about 300 to 750 and that are from the group consisting of (a) solvent extracts obtained in the solvent extraction of mineral lubricating oil using a solvent selective for aromatic compounds, (b) hydrogenated solvent extracts, (c) FCC recycle stock, and (d) mixtures thereof; (2) a dibasic acid having about 2 to 20 carbon atoms in the hydrocarbon portion thereof; and (3) a polyol having about 2 to 20 carbon atoms in the hydrocarbon portion thereof, said fluid polyester containing unreacted carboxyl groups and being unsaturated and unpolymerized and being present in an amount sufficient to impart adhesiveness and cohesiveness to the composition.

2. The composition of claim 1 in which the complex carboxylic acid is derived from solvent extracts obtained in the solvent extraction of mineral lubricating oils using a solvent selective for aromatic compounds.

3. The composition of claim 1 in which the mineral lubricating oil comprises a neutral oil and a solvent extract from the manufacture of lubricating oil.

4. The composition of claim 3 which additionally contains asphalt in an amount sufficient to impart the desired viscosity to the composition.

5. The composition of claim 4 which contains about 30 to 50 percent by weight of asphalt and about 30 to 60 percent by weight of solvent extract.

6. The composition of claim 1 which additionally contains an extreme pressure agent in an amount sufficient to impart extreme pressure properties to the composition.

7. The composition of claim 2 in which the polyester is prepared by reacting about 1 equivalent of the complex carboxylic acids, about 3 equivalents of maleic anhydride and about 3 equivalents of a mixture of triethylene glycol and diethylene glycol.

8. A lubricating composition in accordance with claim 1 in which said fluid polyester is present in an amount ranging from about 0.1 to 1.0 weight percent.

9. A lubricating composition in accordance with claim 1 in which said polyol is a member of the group consisting of diethylene glycol, triethylene glycol, dipropylene glycol, tripropylene glycol, 1,6-hexamethylene glycol and mixtures thereof.

10. A lubricating composition in accordance with claim 1 in which said dibasic acid is a $C_4$ to $C_{11}$ unsaturated dibasic acid.

11. The process of lubricating metal parts using the composition of claim 1.

References Cited by the Examiner

UNITED STATES PATENTS

| | | | |
|---|---|---|---|
| 2,224,035 | 12/1940 | Long | 260—75 |
| 2,952,646 | 9/1960 | Carmody | 260—75 |
| 2,970,164 | 1/1961 | Jezl | 260—451 |
| 3,129,192 | 4/1964 | Kramer et al. | 260—22 |
| 3,130,159 | 4/1964 | Stedt | 252—56 |
| 3,153,087 | 10/1964 | Kramer et al. | 260—327 |
| 3,154,507 | 10/1964 | Kramer et al. | 260—22 |
| 3,180,876 | 4/1965 | Joo | 260—327 |

DANIEL E. WYMAN, *Primary Examiner.*

L. G. XIARHOS, *Assistant Examiner.*